United States Patent
Venkatanarayanan et al.

(10) Patent No.: US 7,536,503 B1
(45) Date of Patent: *May 19, 2009

(54) METHODS AND SYSTEMS FOR PRESERVING DISK GEOMETRY WHEN MIGRATING EXISTING DATA VOLUMES

(75) Inventors: Prakash Venkatanarayanan, Milford, MA (US); Helen S. Raizen, Jamaica Plain, MA (US); Michael E. Bappe, Loveland, CO (US); Arieh Don, Newton, MA (US); Anestis Panidis, Marlborough, MA (US); Jeffrey A. Lewis, Ashland, MA (US)

(73) Assignee: EMC Corporation, Hopkinton, MA (US)

(*) Notice: Subject to any disclaimer, the term of this patent is extended or adjusted under 35 U.S.C. 154(b) by 204 days.

This patent is subject to a terminal disclaimer.

(21) Appl. No.: 11/478,946

(22) Filed: Jun. 30, 2006

(51) Int. Cl.
G06F 12/19 (2006.01)
G06F 12/65 (2006.01)

(52) U.S. Cl. .................... 711/112; 711/203
(58) Field of Classification Search .............. None
See application file for complete search history.

(56) References Cited

U.S. PATENT DOCUMENTS 6,883,049 B1 * 4/2005 Fuld et al. .............. 710/74
7,206,863 B1 4/2007 Oliveira et al.
2005/0235132 A1 * 10/2005 Karr et al. .............. 711/203

OTHER PUBLICATIONS

U.S. Appl. No. 11/478,897, filed Jun. 30, 2006, Pair File History, 98 pages.

* cited by examiner

*Primary Examiner*—Hyung S Sough
*Assistant Examiner*—Duc T Doan
(74) *Attorney, Agent, or Firm*—Daly, Crowley, Mofford & Durkee, LLP (57) ABSTRACT

Methods and systems for preserving a disk geometry when relabeling a storage device containing data migrated from a previous data storage device having different disk geometry. Prior to relabeling, the label of the storage device includes information on the disk geometry of the previous data storage device. An exemplary method includes reading the label of the storage device in response to a request for information related to a disk geometry of the storage device, which is normally answered without reference to the label of the storage device, and reporting the information related to the disk geometry from the label if the label is associated with an operating system that considers a geometry of a storage device when partitioning.

20 Claims, 7 Drawing Sheets

```
122 Target disk label (after data migration)

Volume name = <       >
ascii name   = <DGC-RAID5-0216 cyl 32766 alt 2 hd 4 sec 16>
pcyl         = 32768
ncyl         = 32766
Acyl         = 2
Nhead        = 4
nsect        = 16
Part  Tag        Flag   Cylinders   Size       Blocks
0     root       wm     0 - 1023    32.00MB    (1024/0/0)     65536
1     swap       wu     1024-3071   64.00MB    (2048/0/0)     131072
2     backup     wu     0 - 32765   1023.94MB  (32766/0/0)    2097024
3     unassigned wm     0           0          (0/0/0)        0
4     unassigned wm     0           0          (0/0/0)        0
5     unassigned wm     0           0          (0/0/0)        0
6     usr        wm     3072-32765  927.94MB   (29694/0/0)    1900416
7     unassigned wm     0           0          (0/0/0)        0
```

112 Source disk label (before data migration)

```
Volume name = <       >
ascii name   = <DGC-RAID5-0216 cyl 32766 alt 2 hd 4 sec 16>
pcyl         = 32768
ncyl         = 32766
Acyl         = 2
Nhead        = 4
nsect        = 16
```

| Part | Tag        | Flag | Cylinders   | Size      | Blocks              |
|------|------------|------|-------------|-----------|---------------------|
| 0    | root       | wm   | 0 - 1023    | 32.00MB   | (1024/0/0) 65536    |
| 1    | swap       | wu   | 1024-3071   | 64.00MB   | (2048/0/0) 131072   |
| 2    | backup     | wu   | 0 - 32765   | 1023.94MB | (32766/0/0) 2097024 |
| 3    | unassigned | wm   | 0           | 0         | (0/0/0) 0           |
| 4    | unassigned | wm   | 0           | 0         | (0/0/0) 0           |
| 5    | unassigned | wm   | 0           | 0         | (0/0/0) 0           |
| 6    | usr        | wm   | 3072-32765  | 927.94MB  | (29694/0/0) 1900416 |
| 7    | unassigned | wm   | 0           | 0         | (0/0/0) 0           |

FIG. 3

122 Target disk label (before data migration)

Volume name = < >
ascii name = <EMC-SYMMETRIX-5671 cyl 3830 alt 2 hd 15 sec 64>
pcyl    = 3832
ncyl    = 3830
acyl    = 2
nhead   = 15
nsect   = 64

| Part | Tag | Flag | Cylinders | Size | Blocks | |
|---|---|---|---|---|---|---|
| 0 | root | wm | 0 - 136 | 64.22MB | (137/0/0) | 131520 |
| 1 | swap | wu | 137 - 410 | 128.44MB | (274/0/0) | 263040 |
| 2 | backup | wu | 0 - 3829 | 1.75GB | (3830/0/0) | 3676800 |
| 3 | unassigned | wm | 0 | 0 | (0/0/0) | 0 |
| 4 | unassigned | wm | 0 | 0 | (0/0/0) | 0 |
| 5 | unassigned | wm | 0 | 0 | (0/0/0) | 0 |
| 6 | usr | wm | 411 - 3829 | 1.57GB | (3419/0/0) | 3282240 |
| 7 | unassigned | wm | 0 | 0 | (0/0/0) | 0 |

FIG. 4

122 Target disk label (after data migration)

```
Volume name = < >
ascii name  = <DGC-RAID5-0216 cyl 32766 alt 2 hd 4 sec 16>
pcyl    = 32768
ncyl    = 32766
Acyl    = 2
Nhead   = 4
nsect   = 16
Part      Tag          Flag   Cylinders      Size         Blocks
  0       root         wm     0 - 1023       32.00MB      (1024/0/0)      65536
  1       swap         wu     1024-3071      64.00MB      (2048/0/0)     131072
  2       backup       wu     0 - 32765      1023.94MB    (32766/0/0)   2097024
  3       unassigned   wm     0              0            (0/0/0)             0
  4       unassigned   wm     0              0            (0/0/0)             0
  5       unassigned   wm     0              0            (0/0/0)             0
  6       usr          wm     3072-32765     927.94MB     (29694/0/0)   1900416
  7       unassigned   wm     0              0            (0/0/0)             0
```

METHODS AND SYSTEMS FOR PRESERVING DISK GEOMETRY WHEN MIGRATING EXISTING DATA VOLUMES

BACKGROUND

Some direct access electronic data storage devices are divided into blocks. "Block" and "sectors" are used interchangeably herein to refer to a data unit of 512 bytes. For ease of addressing, an electronic data storage device may designate a number of blocks as a head and a number of heads as a cylinder. Each such device may include a number of cylinders. Various manufacturers design their electronic data storage devices to designate different numbers of blocks as a head and different numbers of heads as a cylinder. Block size, on the other hand, is standardized among manufacturers. Thus, each of these electronic data storage devices must be able to identify the number of cylinders, the number of heads, and the number of sectors in the device. This information may be referred to as disk geometry or geometry information.

At least one operating system takes some of this information into account when partitioning a device. A "partition" is an area on a disk having a beginning and an end. "Partitioning" refers to the division of a storage device into a plurality of partitions, and the process of determining where such divisions will be. The SOLARIS operating system (OS), for example, partitions devices in terms of cylinders. The SOLARIS OS also reserves the last two cylinders of a device for its own use. The SOLARIS OS is available from Sun Microsystems Inc. Information on the disk geometry is stored together in a block known as the "label." The label is a data entity which describes what is on the device. The label may include the location and size of each partition in a device. The SOLARIS OS, for example, stores the label of an electronic data storage device in the first block of the device, and other areas toward the end of the device.

Some requests can be used to obtain current disk geometry information from a target storage device, without referring to the label of the target storage device. Such requests can be, for example, a command that uses a protocol called "SCSI" (Small Computer System Interface) to communicate between devices. Three SCSI commands can be used to obtain current disk geometry information from a target device without reference to the label of the storage device. The Mode Sense Page 3 command, for example, can be used to obtain the number of sectors in a head and the number of heads in a cylinder of the target device. Mode Sense Page 4 command can be used to obtain the number of cylinders in the target device. Read Capacity command can be used to obtain the number of sectors in the target device. The number of sectors in a target device also can be determined by multiplying the number of sectors in a head by the number of heads in a cylinder and by the number of cylinders in the device.

Today, users generally don't consider disk geometry when selecting a electronic data storage device. Instead, users generally consider the total storage capacity of the device as a whole. For example, a user may know that a device has 50 Gbytes of storage capacity, but likely will not know how that capacity is divided into cylinders, heads, and sectors within each head. Thus, a user may have devices with different disk geometries without knowing that these differences exist.

The inventors of the present invention recognized that the disk geometry of the storage device on which data was originally stored can be important today, particularly when a user is working with devices having different disk geometries.

SUMMARY OF EXEMPLARY EMBODIMENTS

Methods and systems are disclosed that relate to preserving a disk geometry when relabeling a storage device containing data migrated from a previous data storage device having different disk geometry. A device is relabeled, for example, with the SOLARIS Format command. One embodiment consistent with principles of the invention is a method for preserving a disk geometry when relabeling a storage device containing data migrated from a previous data storage device having different disk geometry. Prior to relabeling, the label of the storage device includes information on the disk geometry of the previous data storage device. This information describes how the data is laid on the device, and includes information on existing partitions. Some of the information on the label relates to the disk geometry to be preserved. The method includes reading the label of the storage device in response to a host request for information related to a disk geometry of the storage device, which is normally answered without reference to the label of the storage device, and reporting the information related to the disk geometry from the label if the label is associated with an operating system that considers a geometry of a storage device when partitioning.

Another embodiment consistent with principles of the invention is also a method for preserving a disk geometry when relabeling a storage device containing data migrated from a previous data storage device having different disk geometry. Prior to relabeling, the label of the storage device includes information on the disk geometry of the previous data storage device. The method includes intercepting a host request for information related to a disk geometry of the storage device, which is normally answered without reference to the label of the storage device, and reading the label of the storage device. The method further includes reporting information related to the disk geometry consistent with the label of the storage device if the label is associated with an operating system that considers a geometry of a storage device when partitioning.

Another embodiment is a storage device comprising data migrated from a previous storage device having different disk geometry and a label including information related to a disk geometry of the previous storage device, which is configured to implement one of the foregoing methods. Another embodiment is a host computer configured to implement one of the foregoing methods. Another embodiment consistent with principles of the invention is a computer-readable medium including instructions to enable the preservation of a disk geometry when relabeling a storage device containing data migrated from a previous data storage device having different disk geometry.

Additional embodiments consistent with principles of the invention are set forth in the detailed description which follows or may be learned by practice of methods or use of systems or articles of manufacture disclosed herein. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Reference is now made in detail to exemplary embodiments of the invention, examples of which are illustrated in the accompanying drawings.

Figure 1:
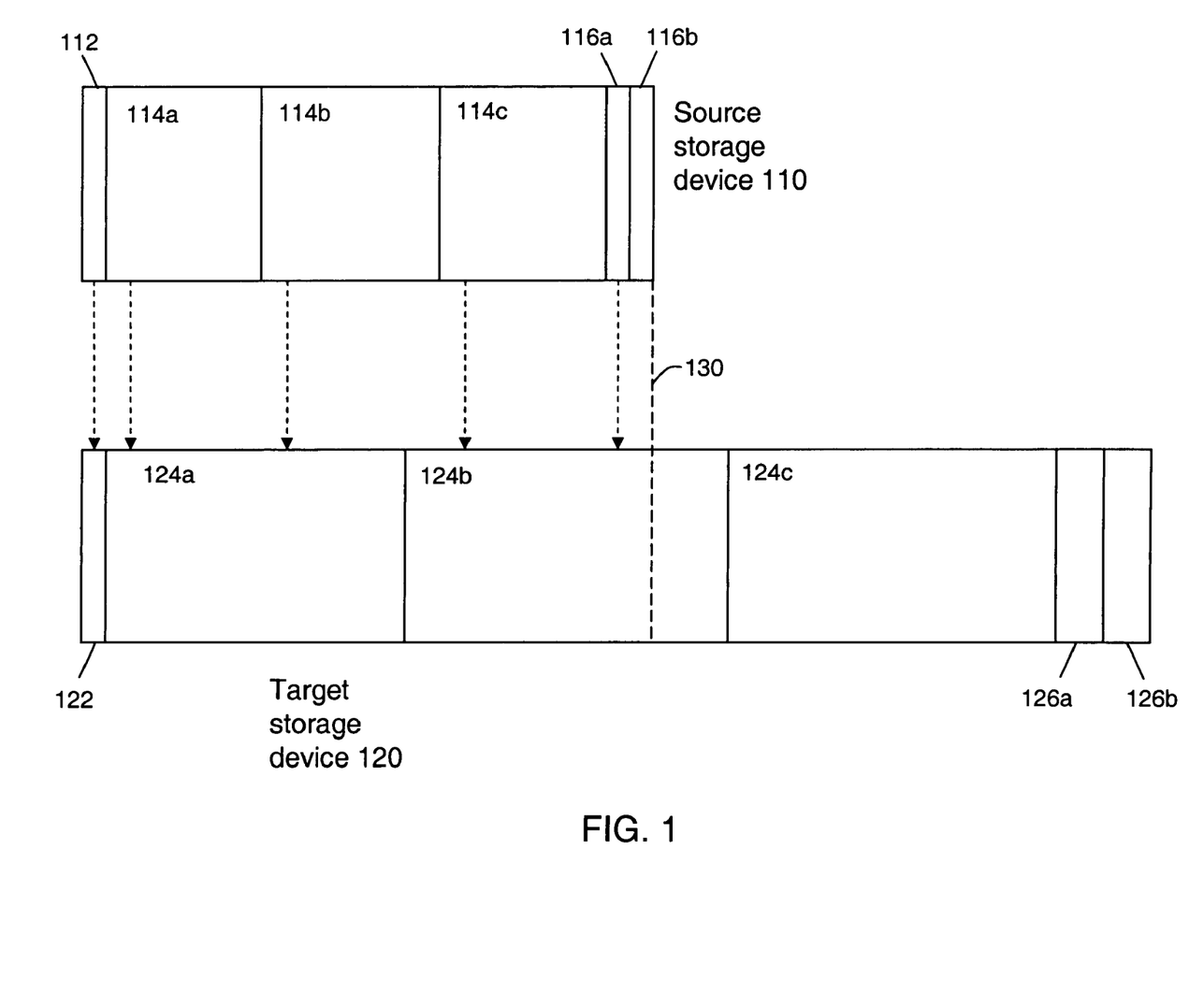
FIG. 1 illustrates exemplary source and target storage devices consistent with features and principles of the present invention.

FIG. 1 illustrates an exemplary source storage device 110 and an exemplary target storage device 120 consistent with features and principles of the present invention. As used herein, a "storage device" is a logical volume. Source device 110 and target device 120 are each associated with an operating system that considers some disk geometry information when partitioning the device. Source device 110 and target device 120 each include a label. In FIG. 1, for example, both devices are associated with the SOLARIS OS, and include a label in the first block of the device and two reserved cylinders at the end of the device. Source device 110 includes label 112 and reserved cylinders 116a, 116b. Similarly, target device 120 includes label 122 and reserved cylinders 126a, 126b.

As illustrated in FIG. 1, source device 110 is smaller than target device 120. Additionally, source device 110 and target device 120 have different geometries. For example, source device 110 could be a SYMMETRIX 6 device, which features 1000 cylinders each including 512 bytes per sector, 64 sectors per head, and 15 heads per cylinder, for a total of 960 sectors per cylinder and 960,000 total sectors. Similarly, data volume 110 could be an IBM FAStT data storage system featuring 512 bytes per sector, 128 sectors per head, and 15 heads per cylinder, for a total of 1920 sectors per cylinder. Alternatively, data volume 110 could be a HDS TagmaStore data storage system features 512 bytes per sector, 512 sectors per head, and 512 tracks heads per cylinder, for a total of 7680 sectors per cylinder. The number of cylinders in both the FAStT system and the TagmaStore system would be determined by the total storage capacity of the system. Target device 120 could be, for example, a SYMMETRIX 7 device, which features 600 cylinders each including 512 bytes per sector, 128 sectors per head, and 15 heads per cylinder, for a total of 1920 sectors per cylinder and 1,152,000 total sectors. EMC Corporation of Hopkinton, Mass. offers the SYMMETRIX line of data storage devices.

Although they have different sizes and geometries, both source device 110 and target device 120 can be configured to have the same number of partitions. FIG. 1 illustrates source device 110 configured with three partitions thereby creating partitions 114a, 114b, and 114c. Similarly, FIG. 1 illustrates target device 120 configured with three partitions thereby creating partitions 124a, 124b, and 124c. Since source device 110 and target device 120 have different geometries and the SOLARIS OS takes some disk geometry information into account when partitioning a device, the partitions in source device 110 and target device 120 do not correspond with one another.

Since source device 110 is smaller than target device 120, data on source device 110 can probably be migrated to target device 120. When data is migrated from source device 110 to target device 120, it is generally copied on a block by block basis. Accordingly, since the label is in the first block of both devices, label 122 of target device 120 is overwritten by label 112 of source device 110.

Figure 3:
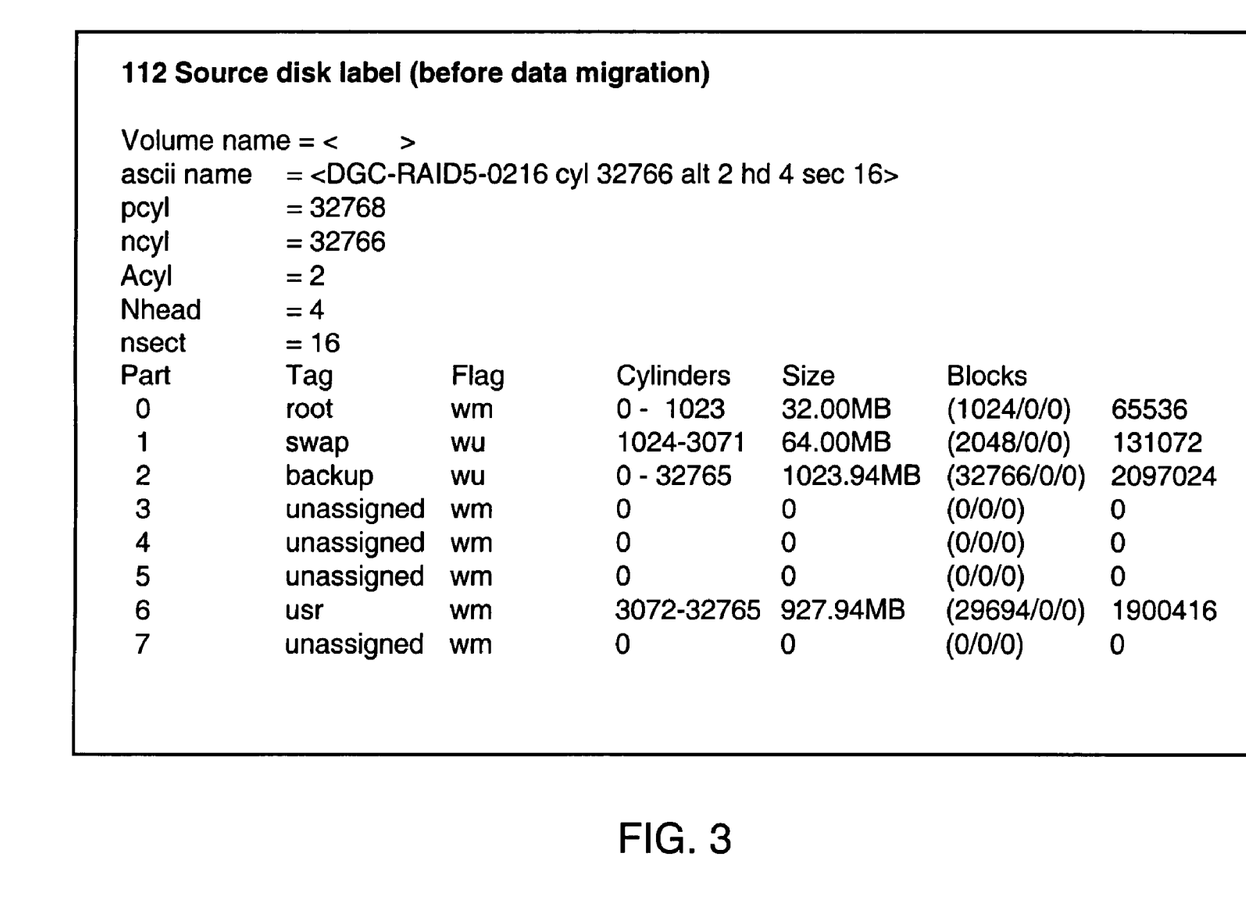
FIG. 3 illustrates a label of an exemplary source storage device consistent with features and principles of the present invention.

FIG. 3 illustrates an exemplary label 112 of source device 110 consistent with features and principles of the present invention. FIG. 3 indicates the native disk geometry of a CLARIION device, offered by EMC Corporation. FIG. 3 specifically indicates that source device 110 includes 32,766 cylinders, 4 heads per cylinder, and 16 sectors per head. Thus, source device 110 includes 2,097,024 blocks of storage as FIG. 3 indicates. Multiplying the number of blocks by the number of bytes in a block (512) gives you the total read capacity of source device 110 in bytes. Source device 110 will normally report this information in response to a SCSI command requesting information related to the geometry of source device 110 without reference to the label of the storage device. For example, source device 110 will normally report that there are 32,766 cylinders in response to a Mode Sense 4 SCSI command. Similarly, source device 110 will normally report that there are 32,097,024 blocks of storage in response to a Read Capacity SCSI command.

Figure 4:
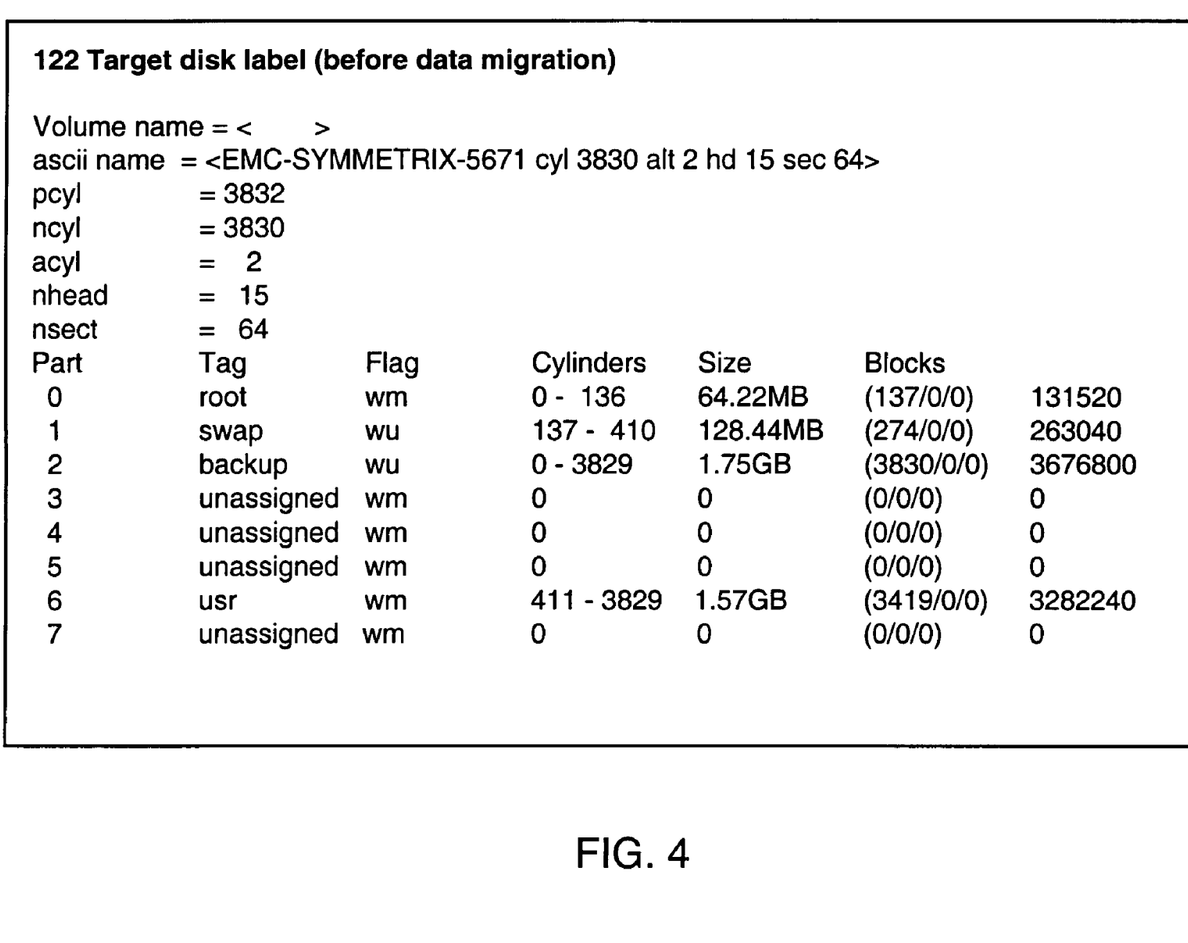
FIG. 4 illustrates a label of an exemplary target storage device prior to data migration consistent with features and principles of the present invention.

Similarly, FIG. 4 illustrates an exemplary label 122 of target device 120 prior to a data migration consistent with features and principles of the present invention. FIG. 4 indicates the native disk geometry of a SYMMETRIX device. FIG. 4 specifically indicates that target device 120 includes 3830 cylinders, 15 heads per cylinder, and 64 sectors per head. Thus, target device 120 includes 3,676,800 blocks of storage as FIG. 4 indicates. Multiplying the number of blocks by the number of bytes in a block (512) gives you the total read capacity of target device 120 in bytes. Target device 120 will normally report this information in response to a SCSI command requesting information related to the geometry of target device 120 without reference to the label of the storage device. For example, target device 120 will normally report that there are 3,832 cylinders in response to a Mode Sense 4 SCSI command.

Figure 5:
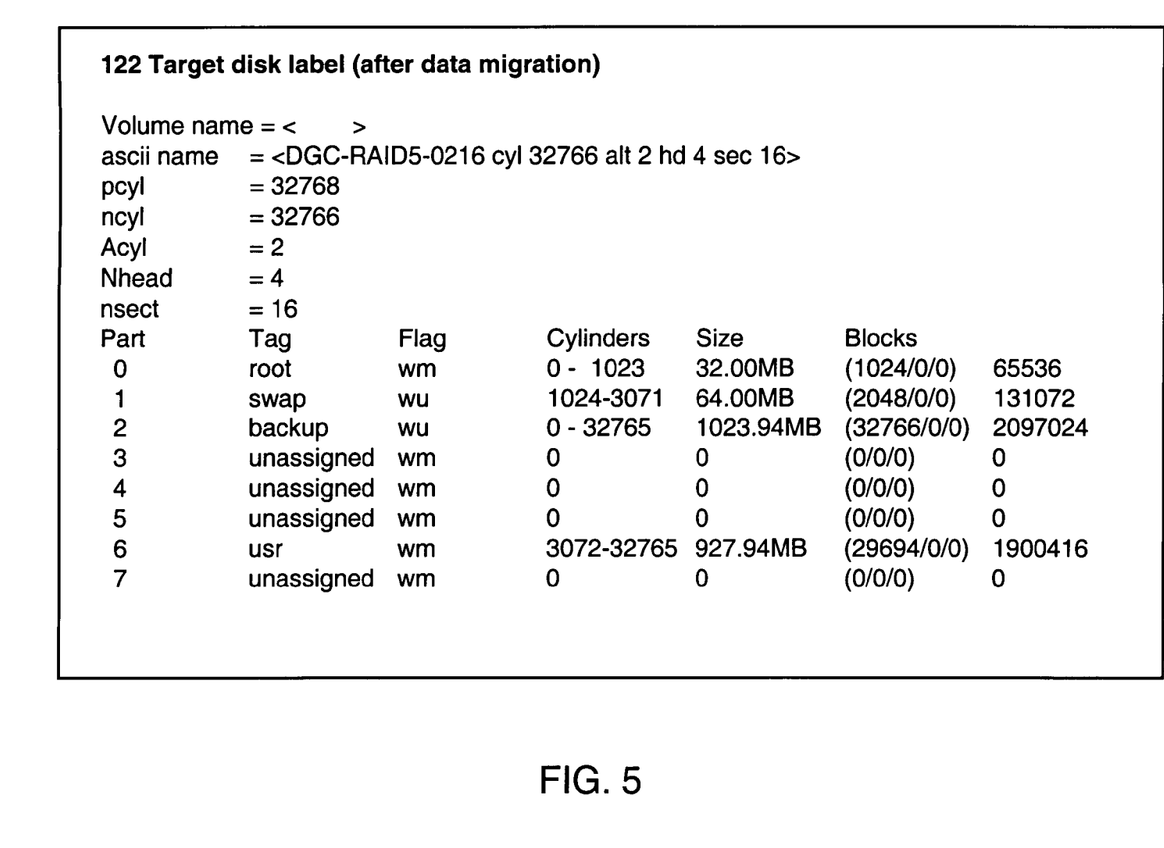
FIG. 5 illustrates a label of an exemplary target storage device after data migration consistent with features and principles of the present invention.

FIG. 5 illustrates the exemplary label 122 of target device 120 after the data from source device 110 has been migrated onto target device 120. The exemplary label 112 of source device 110 has been copied over the original label 122 of target device 120. Label 122 of FIG. 5 no longer includes the native disk geometry of the target SYMMETRIX device 120. Instead, label 122 indicates that target device 120 includes 32,766 cylinders, 4 heads per cylinder, and 16 sectors per head. The partition information included in label 112 of source device 110, shown in FIG. 3, is also copied into label 122 of target device 120 during migration.

Figure 2:
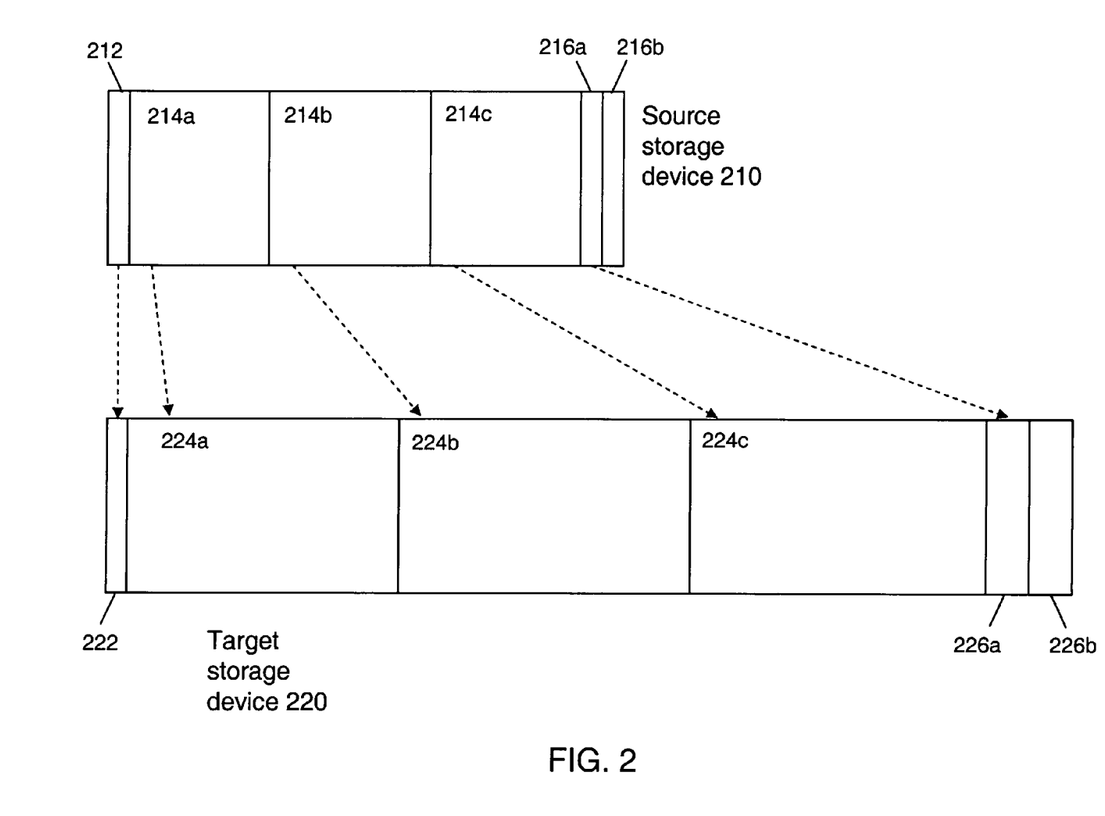
FIG. 2 also illustrates exemplary source and target storage devices consistent with features and principles of the present invention.

The information in label 122 of FIG. 5 can be used to locate the other data from source device 110 that has been migrated onto target device 120. For example, if a user wants to access data that was in the first block of partition 114b of source device 110 in FIG. 1 after it has been migrated to target device 120, the operating system will first need to identify the beginning of the partition 114b. Moreover, the operating system will be unable to locate the data that was in the first block of partition 114*b* without first identifying the beginning of the partition. As illustrated in FIG. 2, if the operating system has the wrong location for the partition, it will access the wrong data.

The information in label 122 of FIG. 5, however, does not effect what target device 120 will report in response to a SCSI command requesting information related to the geometry of target device 120. Thus, even with label 122 of FIG. 5, if target device 120 is a SYMMETRIX device having the native disk geometry indicated in FIG. 4, it will still normally report that there are 3,832 cylinders in response to a Mode Sense 4 SCSI command.

After migrating data from source device 110 to target device 120, a user may want to relabel target device 120. In the context of this specification, "relabeling" refers to modifying a label of a storage device. Thus, when a user tries to modify label 122 of target device 120, the user is trying to relabel target device 120. A user can use the SOLARIS Format command to relabel a device. For example, the user may want to take advantage of some available storage space on target device 120. Line 130 of FIG. 1 indicates the maximum extent of storage space on target device 120 that can be used by migrating data from source device 110 to target device 120. Accordingly, all space to the right of line 130 in target device 120 may be available after migrating data from source device 110 to target device 120.

Problems can arise when a user tries to relabel a storage device containing data migrated from a previous storage device having different disk geometry. Typically, when a label exists on a storage device, the operating system uses that label to identify the disk geometry including the partition locations. The inventors of the present invention recognized, however, that an operating system may use geometry information related to a disk geometry of the storage device that was obtained without reference to the label of the storage device to build a new label when relabeling a storage device. When relabeling a storage device, the SOLARIS Format command, for example, will use SCSI commands to obtain information related to the geometry of the storage device without reference to the label. Thus, the SOLARIS OS will use the geometry information indicated in FIG. 4, which would be normally reported by the SYMMETRIX target device 120 in response SCSI commands, instead of the geometry information indicated in FIG. 5, which is included in label 122. As a result, the SOLARIS OS will put the partitions in the locations dictated by the native geometry of the target device 120 and not maintain the partitions copied from the source device 110. The data migrated from source device 110 to target device 120 may thus be corrupted.

Figure 6:
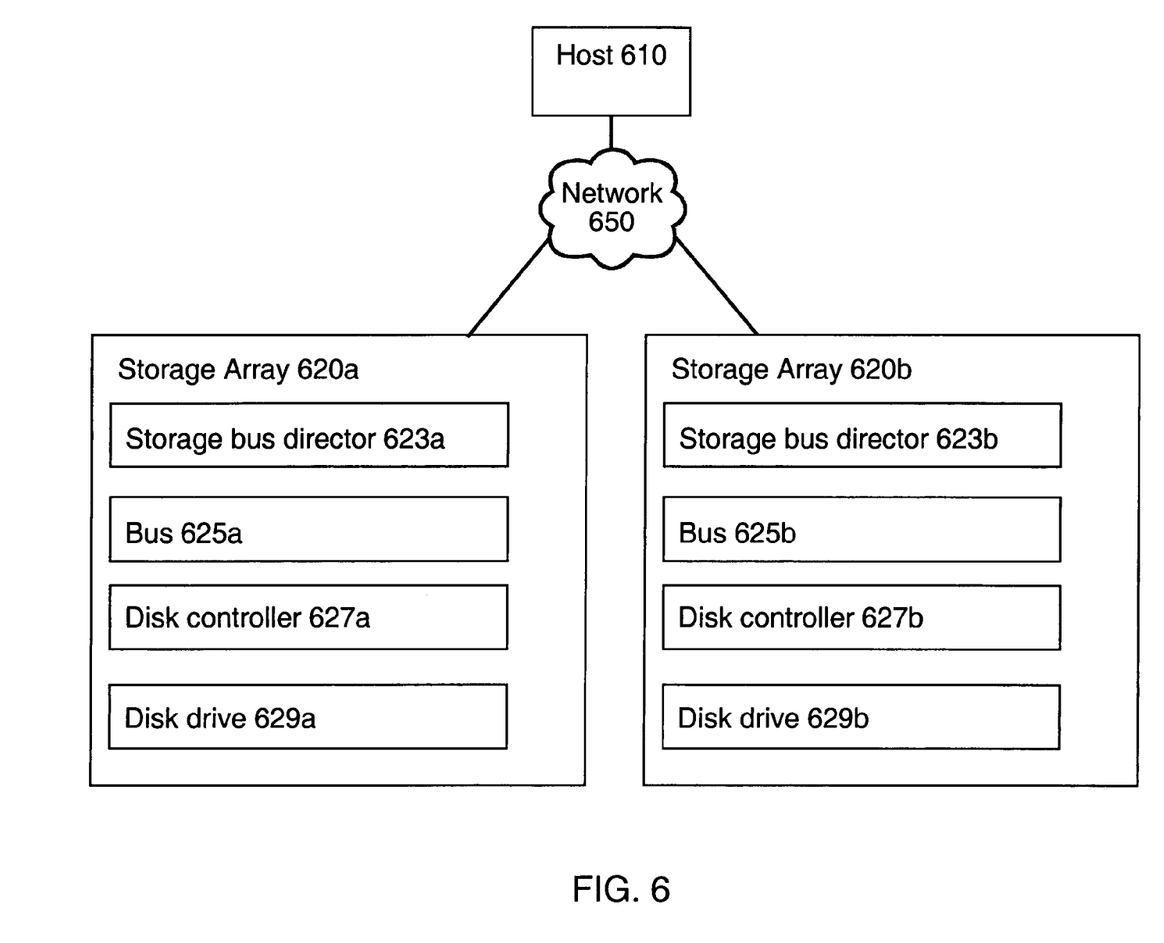
FIG. 6 illustrates an exemplary computer system consistent with features and principles of the present invention.

The inventors of the present invention have identified these problems and methods and systems for preserving disk geometry when relabeling a storage device containing data migrated from a previous data storage device having different disk geometry. FIG. 6 illustrates an exemplary computer system consistent with features and principles of the present invention. The exemplary computer system of FIG. 6 includes at least one host 610 connected via network 650 to at least one storage device 620.

FIG. 6 specifically illustrates two storage arrays 620*a*, 620*b*. Each storage array may be a storage device consistent with features and principles of the present invention. In an alternative embodiment which is not described, each storage array may include one or more storage devices consistent with features and principles of the present invention. The storage arrays have different geometries. For example, storage array 620*a* may be a CLARIION device having the geometry indicated in FIG. 3. Similarly, storage array 620*b* may be a SYMMETRIX device having the geometry indicated in FIG. 4. Data from storage array 620*a* has been migrated to storage array 620*b*. Thus, storage array 620*b* includes a label consistent with FIG. 5.

FIG. 6 specifically illustrates one host 610. When a user tries to relabel storage array 620*b*, the SOLARIS Format command will send SCSI commands requesting information related to the disk geometry of the storage array 620*b* to be received by storage array 620*b*. Further, in normal operation, storage array 620*b* will respond by reporting the native array geometry parameters (indicated in FIG. 4)—such as pcyl=3832, nhead=15, and nsect=64. Thus, in normal operation, the SOLARIS OS will use the geometry information indicated in FIG. 4, which would be normally reported by the SYMMETRIX target device 120 in response SCSI commands, instead of the geometry information indicated in FIG. 5, which is included in label 122, to relabel target device 120.

Storage array 620*b* in FIG. 6 includes at least one storage bus director 623*b*, a bus 625*b*, at least one disk controller 627*b*, and at least one disk drive 629*b*. Each storage bus director 623*b* controls communication between storage array 620*b* and other components on network 650. The storage bus director 623*b* may be implemented as a SCSI driver to interact with other SCSI drivers where network 650 includes a SCSI bus. Alternatively, network 650 can be implemented as a Fibre channel fabric. The at least one storage bus director 623, the at least one disk controller 627*b*, and the at least one disk drive 629*b* communicate over bus 625*b*. Each disk controller 627*b* typically controls access to a plurality of disk drives 629*b*.

When a user tries to relabel storage array 620*b*, storage array 620*b* will receive SCSI commands requesting information related to the disk geometry of the storage array 620*b*. Consistent with features and principles of the present invention, storage array 620*b* is configured to read its label, for example label 122 of FIG. 5, instead of simply reporting its native geometry. In one embodiment, if a copy of the label of storage array 620*b* is stored in cache, storage array 620*b* may read that copy instead of the original label. If the label is associated with an operating system that considers a geometry of a storage device when partitioning, storage array 620*b* reports the information related to the disk geometry from the label. The operating system will then write the reported information to the label of storage array 620*b* instead of the geometry information that would normally have been reported. Thus, the geometry information in the label of storage array 620*b* will be preserved.

Storage array 620*b* can implement the foregoing function, for example, in storage bus director 623*b*. Alternatively, storage array 620*b* can implement the foregoing function in an additional software layer (not shown).

Figure 7:
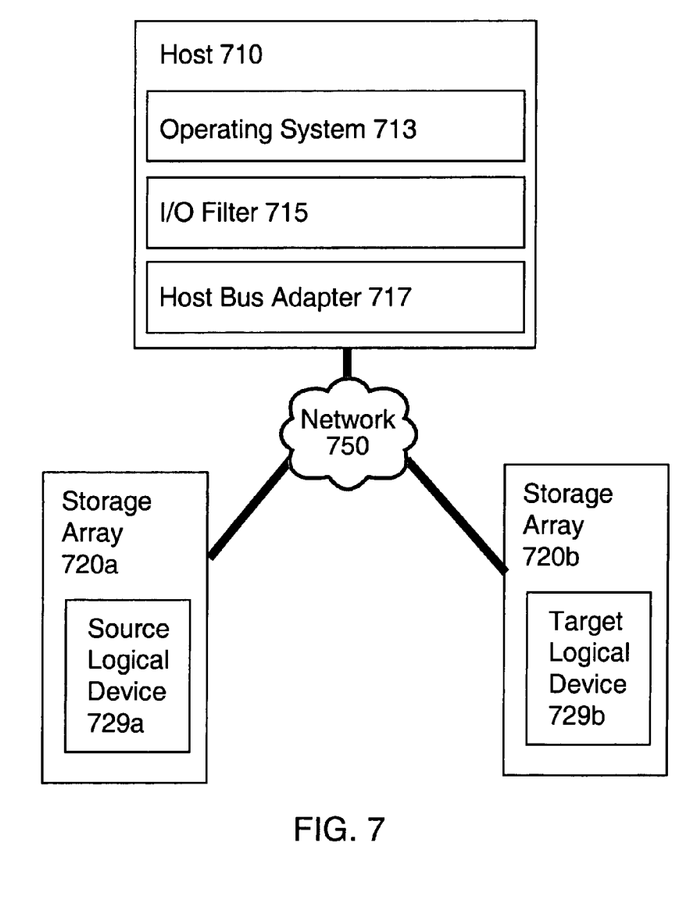
FIG. 7 illustrates another exemplary computer system consistent with features and principles of the present invention.

FIG. 7 illustrates another exemplary computer system consistent with features and principles of the present invention. The exemplary computer system of FIG. 7 includes at least one host 710 connected via network 750 to at least one storage array 720. FIG. 7 specifically illustrates one host 710. Host 710 includes an operating system 713, an input/output (I/O) filter 715, and at least one host bus adapter 717. The at least one host bus adaptor 717 controls communication between host 710 and other components on network 750. The host bus adapter 717 may be implemented as a SCSI driver to interact with other SCSI drivers where network 750 includes a SCSI bus. Alternatively, network 750 can be implemented as a Fibre channel fabric. The I/O filter 715 handles communication between the at least one host bus adapter 717 and the operating system 713.

FIG. 7 specifically illustrates two storage arrays 720a, 720b. The storage arrays have different geometry. For example, storage array 720a may be a CLARIION device having the geometry indicated in FIG. 3. Similarly, storage array 720b may be a SYMMETRIX device having the geometry indicated in FIG. 4. Data from storage array 720a has been migrated to storage array 720b. Thus, storage array 720b includes a label consistent with FIG. 5.

When a user tries to relabel storage array 720b, the SOLARIS Format command in operating system 713 will initiate SCSI commands requesting information related to the disk geometry of the storage array 720b. Thus, in normal operation, the SOLARIS OS will use the geometry information indicated in FIG. 4, which would be normally reported by the SYMMETRIX target device 120 in response SCSI commands, instead of the geometry information indicated in FIG. 5, which is included in label 122, to relabel target device 120.

Consistent with features and principles of the present invention, I/O filter 715 intercepts the SCSI commands requesting information related to the disk geometry of storage array 720b and translates it into a request to read the label of the storage array 720b. If the label is associated with an operating system that considers a geometry of a storage device when partitioning, I/O filter 715 will report information related to the disk geometry consistent with the label of the storage device instead of the native disk geometry. If a copy of the label of storage array 720b is stored in cache, storage array 720b may read that copy instead of the original label. In this example, I/O filter 715 will report the geometry information indicated in FIG. 5 instead of the geometry information indicated in FIG. 4. The operating system will then write the reported information to the label of storage array 720b instead of the geometry information that would normally have been reported. Thus, the geometry information in the label of storage array 620b will be preserved.

One of ordinary skill in the art will appreciate that features and principles of the present invention may be implemented in a computer-readable medium (e.g., floppy disk, CD-ROM, storage device, etc.) containing instructions, which may be executed by storage array 720b or host 710, when relabeling a storage device containing data migrated from a previous data storage device having different disk geometry, to preserve the disk geometry on the label of a storage device that includes data on the disk geometry of a previous data storage device. One of ordinary skill in the art will also appreciate that features and principles of the present invention may be implemented in different elements of a storage device or host.

The embodiments and aspects of the invention set forth above are only exemplary and explanatory. They are not restrictive of the invention as claimed. Other embodiments consistent with features and principles are included in the scope of the present invention. As the following sample claims reflect, inventive aspects may lie in fewer than all features of a single foregoing disclosed embodiment. Thus, the following claims are hereby incorporated into this description, with each claim standing on its own as a separate embodiment of the invention.

What is claimed is:

1. A method, comprising:
preserving a disk geometry when relabeling a storage device containing data migrated from a previous data storage device having different disk geometry, wherein a label of the storage device includes partition information based on a disk geometry of the previous data storage device, the preserving comprising:

in response to a host request for information related to a disk geometry of the storage device, which is normally answered without reference to the label, reading the label of the storage device;
if the label is associated with an operating system that considers a geometry of the storage device when partitioning, reporting the information related to the disk geometry from the label.

2. The method of claim 1 wherein the host request for information related to a disk geometry of the storage device comprises a request for a number of sectors per head and wherein reporting the information related to the disk geometry from the label comprises reporting the number of sectors per head in the label.

3. The method of claim 1 wherein the host request for information related to a disk geometry of the storage device comprises a request for a number of heads per cylinder and wherein reporting the information related to the disk geometry from the label comprises reporting the number of heads per cylinder in the label.

4. The method of claim 1 wherein the host request for information related to a disk geometry of the storage device comprises a request for the number of cylinders in the storage device, such as a Mode Sense Page 4 SCSI command.

5. The method of claim 1 wherein the host request for information related to a disk geometry of the storage device comprises a request for the number of blocks in the storage device, such as a Read Capacity SCSI command.

6. The method of claim 1 wherein reading the label of the storage device comprising reading a stored copy of the label of the storage device.

7. A storage device comprising
data migrated from a previous storage device having different disk geometry and a label including partition information based on a disk geometry of the previous storage device, wherein the storage device is configured with instructions to perform a method for preserving the disk geometry when relabeling the storage device, the method comprising:
in response to a host request for information related to a disk geometry of the storage device, which is normally answered without reference to the label, reading the label of the storage device;
if the label is associated with an operating system that considers a geometry of the storage device when partitioning, reporting the information related to the disk geometry from the label.

8. The device of claim 7 wherein the host request for information related to a disk geometry of the storage device comprises a request for the number of sectors per head in the storage device, such as a Mode Sense Page 3 SCSI command.

9. The device of claim 7 wherein the host request for information related to a disk geometry of the storage device comprises a request for the number of cylinders in the storage device, such as a Mode Sense Page 4 SCSI command.

10. The device of claim 7 wherein the host request for information related to a disk geometry of the storage device comprises a request for the number of blocks in the storage device, such as a Read Capacity SCSI command.

11. A method, comprising:
preserving a disk geometry when relabeling a storage device containing data migrated from a previous data storage device having different disk geometry, wherein the label of the storage device includes partition information based on a disk geometry of the previous data storage device, the preserving comprising:

intercepting a host request for information related to a disk geometry of the storage device, which is normally answered without reference to a label of the storage device;

reading information from the label of the storage device;

if the label is associated with an operating system that considers a geometry of the storage device when partitioning, reporting information related to the disk geometry consistent with a label of the storage device.

12. The method of claim 11 wherein the host request for information related to a disk geometry of the storage device comprises a request for a number of sectors per head and wherein reporting the information related to the disk geometry from the label comprises reporting the number of sectors per head in the label.

13. The method of claim 11 wherein the host request for information related to a disk geometry of the storage device comprises a request for a number of heads per cylinder and wherein reporting the information related to the disk geometry from the label comprises reporting the number of heads per cylinder in the label.

14. The method of claim 11 wherein the host request for information related to a disk geometry of the storage device comprises a request for the number of cylinders in the storage device, such as a Mode Sense Page 4 SCSI command.

15. The method of claim 11 wherein the host request for information related to a disk geometry of the storage device comprises a request for the number of blocks in the storage device, such as a Read Capacity SCSI command.

16. The method of claim 11 wherein reading the label of the storage device comprising reading a stored copy of the label of the storage device.

17. A host computer comprising an input/output (I/O) filter configured with instructions to perform a method for preserving a disk geometry when relabeling a storage device containing data migrated from a previous data storage device having different disk geometry, wherein the label of the storage device includes partition information based on a disk geometry of the previous data storage device, the method comprising:

intercepting a host request for information related to a disk geometry of the storage device, which is normally answered without reference to a label of the storage device;

reading information from the label of the storage device;

if the label is associated with an operating system that considers a geometry of the storage device when partitioning, reporting information related to the disk geometry consistent with a label of the storage device.

18. The computer of claim 17 wherein the host request for information related to a disk geometry of the storage device comprises a request for the number of sectors per head in the storage device, such as a Mode Sense Page 3 SCSI command.

19. The computer of claim 17 wherein the host request for information related to a disk geometry of the storage device comprises a request for the number of cylinders in the storage device, such as a Mode Sense Page 4 SCSI command.

20. The computer of claim 17 wherein the host request for information related to a disk geometry of the storage device comprises a request for the number of blocks in the storage device, such as a Read Capacity SCSI command.

* * * * *